US012675723B2

(12) United States Patent
Low

(10) Patent No.: US 12,675,723 B2
(45) Date of Patent: Jul. 7, 2026

(54) REDUCED DENSITY MATRIX ESTIMATION FOR PARTICLE-NUMBER-CONSERVING FERMION SYSTEM

(71) Applicant: Microsoft Technology Licensing, LLC, Redmond, WA (US)

(72) Inventor: Guang Hao Low, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 657 days.

(21) Appl. No.: 18/317,024

(22) Filed: May 12, 2023

(65) Prior Publication Data

US 2024/0378479 A1     Nov. 14, 2024

(51) Int. Cl.
   *G06N 10/60*        (2022.01)
   *G06N 10/80*        (2022.01)
(52) U.S. Cl.
   CPC ............. *G06N 10/60* (2022.01); *G06N 10/80* (2022.01)
(58) Field of Classification Search
   None
   See application file for complete search history.

(56) References Cited

U.S. PATENT DOCUMENTS 9,786,036 B2 *  10/2017  Annapureddy ....... G06T 3/4046
   12,073,287 B2 *   8/2024  Das ......................... G06F 9/382

12,265,760 B2 *   4/2025  Babbush ................. G06F 30/20
   2018/0189580 A1 *  7/2018  Lee ........................... G06T 7/12
   2020/0293937 A1 *  9/2020  Babbush ............... G06N 10/40
   2021/0248476 A1 *  8/2021  Fischbacher ........... G06N 3/048
   2023/0409895 A1 * 12/2023  Liu ........................ G16C 20/30

OTHER PUBLICATIONS

International Search Report and Written Opinion received for PCT Application No. PCT/US2024/28912, mailed on Nov. 28, 2025, 16 pages.
Bravyi, Sergey, "Lagrangian Representation for Fermionic Linear Optics", In Repository of arXiv:quant-ph/0404180v1, Apr. 30, 2004, 11 Pages.

(Continued)

*Primary Examiner* — Maikhanh Nguyen
(74) *Attorney, Agent, or Firm* — Alleman Hall LLP

(57)                ABSTRACT

A computing device including one or more processing devices configured to receive classical shadow measurement results associated with a fermion wavefunction. The fermion wavefunction may describe a particle-number-conserving fermion system. The one or more processing devices may compute an estimated k-reduced density matrix (k-RDM), where k is a number of ladder operator pairs. Computing the estimated k-RDM may include computing, as terms of the estimated k-RDM, traces of respective products of a number operator of the particle-number-conserving fermion system, a single-particle basis rotation matrix dependent upon the classical shadow measurement result, elementary symmetric polynomials of Majorana bivectors, and a conjugate transpose of the single-particle basis rotation matrix. Computing each trace may include iteratively computing derivatives of a Pfaffian. The one or more processing devices may output the estimated k-RDM.

20 Claims, 6 Drawing Sheets

(56) References Cited

OTHER PUBLICATIONS

Brod, Danielj. , "Efficient Classical Simulation of Matchgate Circuits with Generalized Inputs and Measurements", In Journal of Physical Review A, vol. 93, Issue 6, Jun. 23, 2016, 10 Pages.

Huggins, et al., "Unbiasing Fermionic Quantum Monte Carlo with a Quantum Computer", In Journal of Nature, vol. 603, Issue 7901, Mar. 17, 2022, pp. 416-420.

Jiang, et al., "Optimal Fermion-to-Qubit Mapping via Ternary Trees with Applications to Reduced Quantum States Learning", In Journal of Quantum, vol. 4, Jun. 4, 2020, pp. 1-10.

Low, Guangh. , "Classical Shadows of Fermions with Particle No. Symmetry", In Repository of arXiv:2208.08964v1, Aug. 18, 2022, pp. 1-27.

Low, et al., "Hamiltonian Simulation in the Interaction Picture", In Repository of arXiv:1805.00675v1, May 2, 2018, pp. 1-30.

Reiher, et al., "Elucidating Reaction Mechanisms on Quantum Computers", In Proceedings of the National Academy of Sciences, vol. 114, Issue 29, Jul. 18, 2017, pp. 7555-7560.

Terhal, et al., "Classical Simulation of Noninteracting-Fermion Quantum Circuits", In Journal of Physical Review A, vol. 65, Issue 3, Mar. 1, 2002, 10 Pages.

Wan, et al., "Matchgate Shadows for Fermionic Quantum Simulation", In Repository of arXiv:2207.13723v1, Jul. 27, 2022, pp. 1-53.

Zhao, et al., "Fermionic Partial Tomography via Classical Shadows", In Journal of Physical Review Letters, vol. 127, Issue 11, Sep. 9, 2021, 8 Pages.

* cited by examiner

100 ⟶

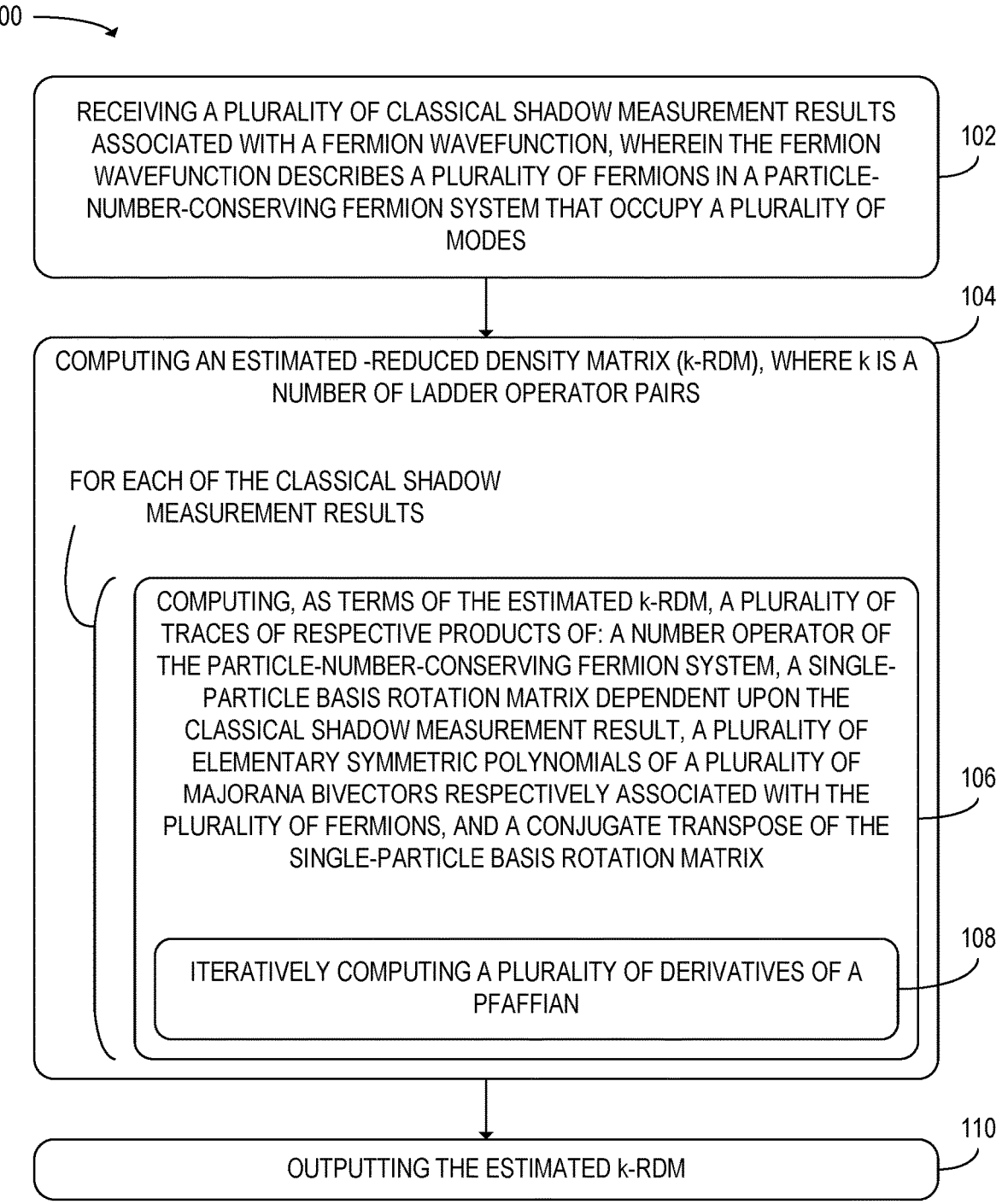

RECEIVING A PLURALITY OF CLASSICAL SHADOW MEASUREMENT RESULTS ASSOCIATED WITH A FERMION WAVEFUNCTION, WHEREIN THE FERMION WAVEFUNCTION DESCRIBES A PLURALITY OF FERMIONS IN A PARTICLE-NUMBER-CONSERVING FERMION SYSTEM THAT OCCUPY A PLURALITY OF MODES — 102

104

COMPUTING AN ESTIMATED -REDUCED DENSITY MATRIX (k-RDM), WHERE k IS A NUMBER OF LADDER OPERATOR PAIRS

FOR EACH OF THE CLASSICAL SHADOW MEASUREMENT RESULTS

COMPUTING, AS TERMS OF THE ESTIMATED k-RDM, A PLURALITY OF TRACES OF RESPECTIVE PRODUCTS OF: A NUMBER OPERATOR OF THE PARTICLE-NUMBER-CONSERVING FERMION SYSTEM, A SINGLE-PARTICLE BASIS ROTATION MATRIX DEPENDENT UPON THE CLASSICAL SHADOW MEASUREMENT RESULT, A PLURALITY OF ELEMENTARY SYMMETRIC POLYNOMIALS OF A PLURALITY OF MAJORANA BIVECTORS RESPECTIVELY ASSOCIATED WITH THE PLURALITY OF FERMIONS, AND A CONJUGATE TRANSPOSE OF THE SINGLE-PARTICLE BASIS ROTATION MATRIX — 106

ITERATIVELY COMPUTING A PLURALITY OF DERIVATIVES OF A PFAFFIAN — 108

110

OUTPUTTING THE ESTIMATED k-RDM

FIG. 4A

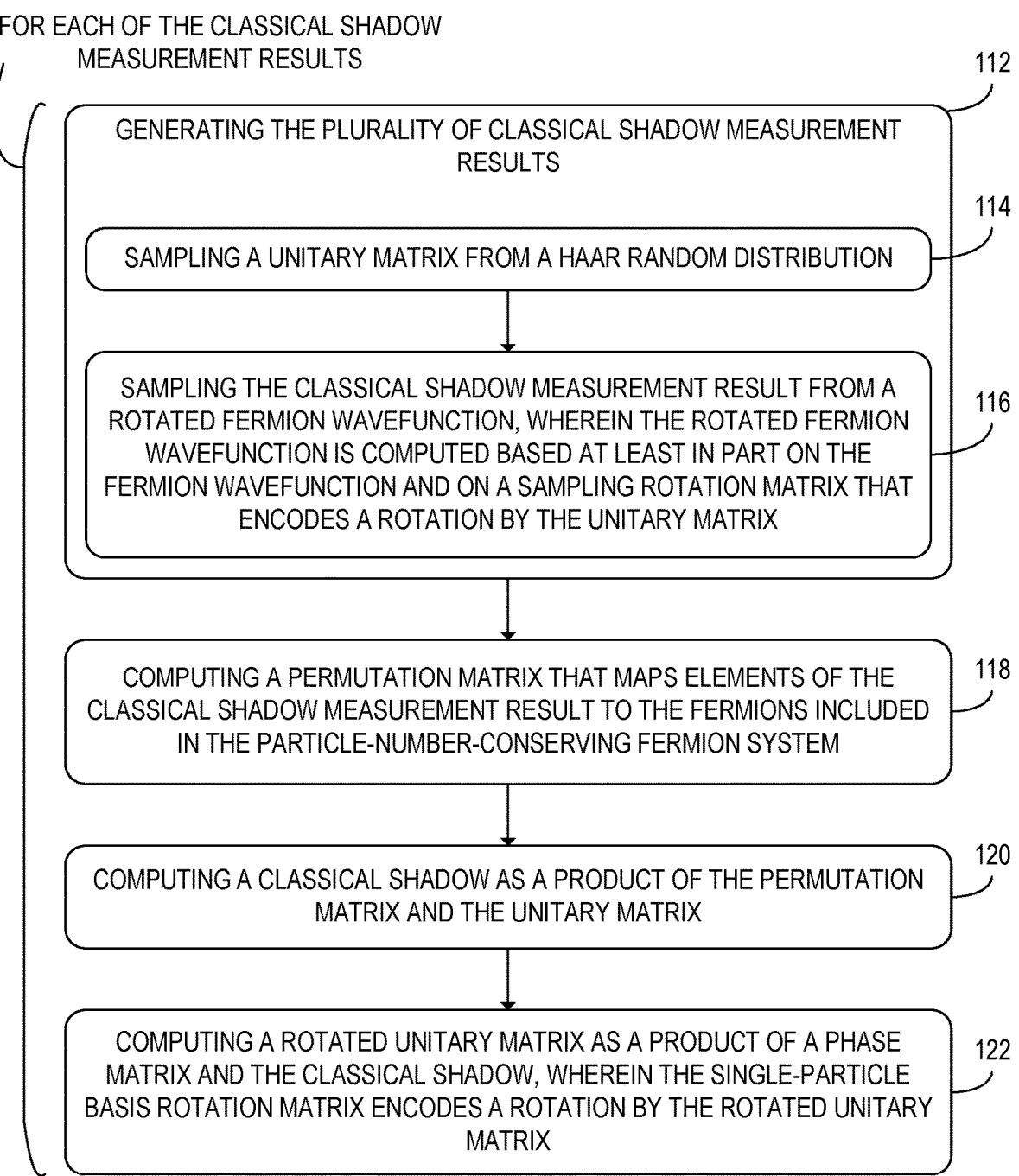

FOR EACH OF THE CLASSICAL SHADOW
MEASUREMENT RESULTS                                                                    112

GENERATING THE PLURALITY OF CLASSICAL SHADOW MEASUREMENT
RESULTS

114

SAMPLING A UNITARY MATRIX FROM A HAAR RANDOM DISTRIBUTION

116

SAMPLING THE CLASSICAL SHADOW MEASUREMENT RESULT FROM A
ROTATED FERMION WAVEFUNCTION, WHEREIN THE ROTATED FERMION
WAVEFUNCTION IS COMPUTED BASED AT LEAST IN PART ON THE
FERMION WAVEFUNCTION AND ON A SAMPLING ROTATION MATRIX THAT
ENCODES A ROTATION BY THE UNITARY MATRIX

118

COMPUTING A PERMUTATION MATRIX THAT MAPS ELEMENTS OF THE
CLASSICAL SHADOW MEASUREMENT RESULT TO THE FERMIONS INCLUDED
IN THE PARTICLE-NUMBER-CONSERVING FERMION SYSTEM

120

COMPUTING A CLASSICAL SHADOW AS A PRODUCT OF THE PERMUTATION
MATRIX AND THE UNITARY MATRIX

122

COMPUTING A ROTATED UNITARY MATRIX AS A PRODUCT OF A PHASE
MATRIX AND THE CLASSICAL SHADOW, WHEREIN THE SINGLE-PARTICLE
BASIS ROTATION MATRIX ENCODES A ROTATION BY THE ROTATED UNITARY
MATRIX

FIG. 4B

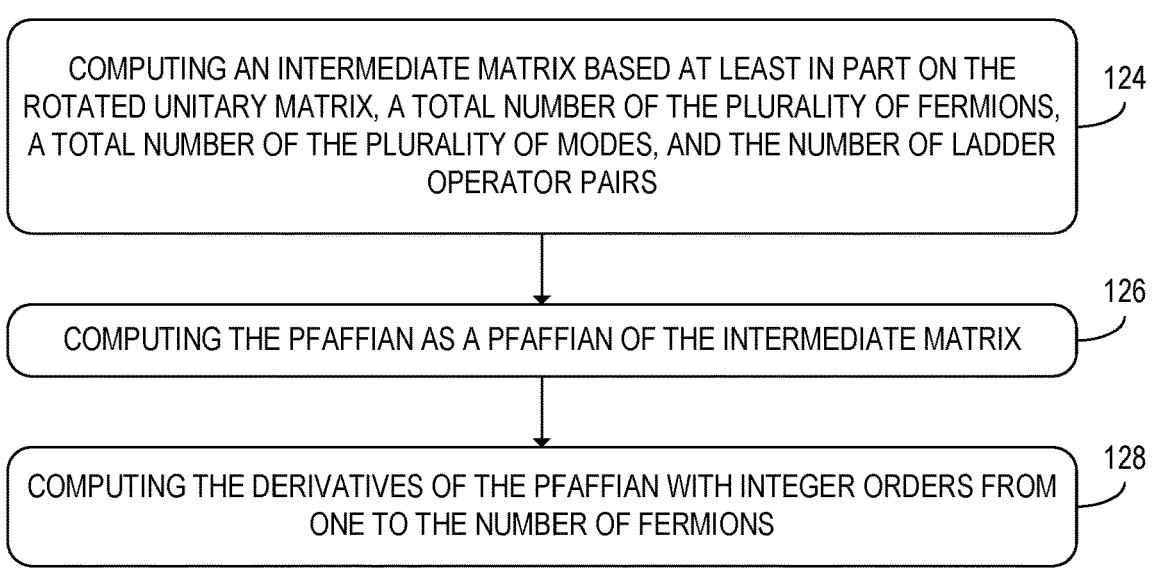

COMPUTING AN INTERMEDIATE MATRIX BASED AT LEAST IN PART ON THE ROTATED UNITARY MATRIX, A TOTAL NUMBER OF THE PLURALITY OF FERMIONS, A TOTAL NUMBER OF THE PLURALITY OF MODES, AND THE NUMBER OF LADDER OPERATOR PAIRS — 124

COMPUTING THE PFAFFIAN AS A PFAFFIAN OF THE INTERMEDIATE MATRIX — 126

COMPUTING THE DERIVATIVES OF THE PFAFFIAN WITH INTEGER ORDERS FROM ONE TO THE NUMBER OF FERMIONS — 128

FIG. 4C

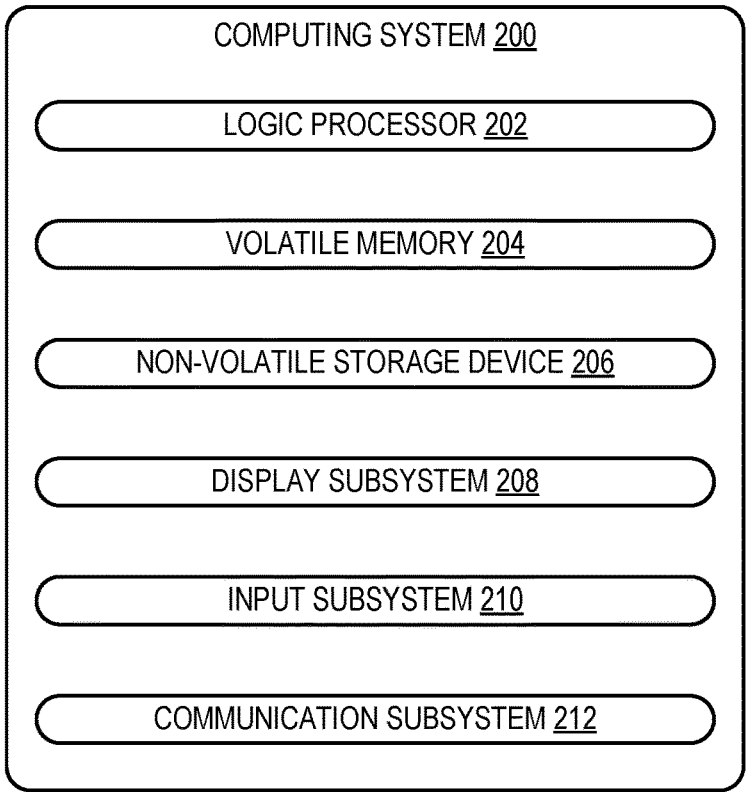

COMPUTING SYSTEM 200

LOGIC PROCESSOR 202

VOLATILE MEMORY 204

NON-VOLATILE STORAGE DEVICE 206

DISPLAY SUBSYSTEM 208

INPUT SUBSYSTEM 210

COMMUNICATION SUBSYSTEM 212

FIG. 5

REDUCED DENSITY MATRIX ESTIMATION FOR PARTICLE-NUMBER-CONSERVING FERMION SYSTEM

BACKGROUND

Simulating the wavefunction of a system of fermions, such as in electronic structure problems in chemistry and material sciences, is one of the most promising applications of quantum computers. Once the fermion wavefunction is prepared on a quantum device, this wavefunction may be characterized in order to evaluate its properties, such as energy, density, and other many-body correlations.

In the case where the wavefunction $\rho$ has particle number symmetry, meaning that the number of fermions $\eta$ occupying n modes is fixed, the properties of the wavefunction are observables O that may be expressed as linear combinations of number-conserving k-Reduced Density Matrices (k-RDMs)

$$D_{\vec{q}}^{\vec{p}}:$$

$$\left\langle D_{\vec{q}}^{\vec{p}} \right\rangle = Tr\left[ D_{\vec{q}}^{\vec{p}} \rho \right]$$

In the above equation, each k-RDM may be expressed as a product of k fermion creation operators and k fermion annihilation operators:

$$D_{\vec{q}}^{\vec{p}} = a_{p_1}^{\dagger} \cdots a_{p_k}^{\dagger} a_{q_k} \cdots a_{q_1}$$

The fermion creation and annihilation operators satisfy the standard anti-commutation relations:

$$\{a_j, a_k^{\dagger}\} = \delta_{jk}$$

$$\{a_j, a_k\} = \{a_j^{\dagger}, a_k^{\dagger}\} = 0$$

In the above definition of $$D_{\vec{q}}^{\vec{p}},$$

the vectors $\vec{p}$, $\vec{q}$ represent which modes are occupied by fermions. The integer elements of these vectors may be listed in ascending order, such that $\vec{p} \in \mathcal{S}_{n,\eta} \doteq \{(z_1, \ldots, z_\eta): \forall j \in [\eta], 1 \leq z_j < z_{j+1} \leq n\}$. In addition, the number operator for the fermion system is given by $$\hat{n}_j = a_j^{\dagger} a_j.$$

Any observable then has the following form:

$$O = \sum_{\vec{p},\vec{q} \in \mathcal{S}_{n,k}} o_{\vec{p},\vec{q}} D_{\vec{q}}^{\vec{p}}$$

for some k and complex coefficients $o_{\vec{q}}^{\vec{p}}$ For example, dipole moment and electron density are characterized by k=1, the electric structure Hamiltonian by k=2, the effective nuclear Hamiltonian by k=3, and the overlap with a single Slater determinant by k=$\eta$. Note that some observables may be linear combination of different k, but the equation for O is without loss of generality as the case of fixed particle number allows up-folding of any k-RDM to a sum of (k+1)-RDMs through the following identity:

$$D_{\vec{q}}^{\vec{p}} = D_{\vec{q}}^{\vec{p}} \frac{\sum_{j \in [n]} a_j^{\dagger} a_j}{\eta}$$

Note that it suffices to consider at most k≤$\eta$, and RDMs with k>$\eta$ are automatically zero.

SUMMARY

According to one aspect of the present disclosure, a computing device is provided, including one or more processing devices configured to receive a plurality of classical shadow measurement results associated with a fermion wavefunction. The fermion wavefunction may describe a plurality of fermions in a particle-number-conserving fermion system that occupy a plurality of modes. The one or more processing devices may be further configured to compute an estimated k-reduced density matrix (k-RDM), where k is a number of ladder operator pairs. Computing the estimated k-RDM may include computing, as terms of the estimated k-RDM, a plurality of traces of respective products of a number operator of the particle-number-conserving fermion system, a single-particle basis rotation matrix dependent upon the classical shadow measurement result, a plurality of elementary symmetric polynomials of a plurality of Majorana bivectors respectively associated with the plurality of fermions, and a conjugate transpose of the single-particle basis rotation matrix. Computing each of the traces may include iteratively computing a plurality of derivatives of a Pfaffian. The one or more processing devices may be further configured to output the estimated k-RDM.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A shows a flowchart of a method for use with a computing device to compute an estimated k-RDM, according to the example of FIG. 2.

FIG. 4B shows additional steps of the method of FIG. 4A that may be performed for each of the classical shadow measurement results.

FIG. 4C shows additional steps of the method of FIG. 4A that may be performed when a plurality of traces and a plurality of derivates of Pfaffians are computed.

FIG. 5 shows a schematic view of an example computing system in which the computing device of FIG. 2 may be instantiated.

DETAILED DESCRIPTION

There exist prior protocols to evaluate all k-RDMs of a fermion system to some target error, or standard deviation, $\epsilon$. These protocols include forming $\rho$, measuring it in some basis, and computing a noisy estimate of the k-RDMs from the measurement outcome. Such protocols may be made more efficient by minimizing the number of copies of $\rho$ needed to achieve the target error $\epsilon$. In the case where there is no particle symmetry, roughly $$\binom{n}{k}\sqrt{k} / \epsilon^2$$

measurements of the quantum state suffice. This expression for the sample efficiency has an explicit dependence on the number of modes but not the number of particles.

One prior protocol exploits particle number symmetry to estimate all number-conserving k-RDMs with a sample complexity of roughly $$\binom{\eta}{k} / \epsilon^2$$

that depends only on the number of fermions. This increase in sample complexity is substantial, as there are many natural applications where $\eta \ll n$, such as in simulating dynamical correlations or in a plane-wave representation of electronic structure. Although the estimator in this protocol is computationally efficient on a classical computer, it may still be impractical, requiring $\mathcal{O}(n^5)$ time to compute a single estimate of a single k-RDM. This $\mathcal{O}(n^5)$ time complexity may be a bottleneck for large-scale estimation considering that the electronic structure Hamiltonian already has $\mathcal{O}(n^4)$ RDMs in general. In addition, other applications such as unbiasing fermionic Monte Carlo may utilize millions of new estimates in every run.

Figure 1:
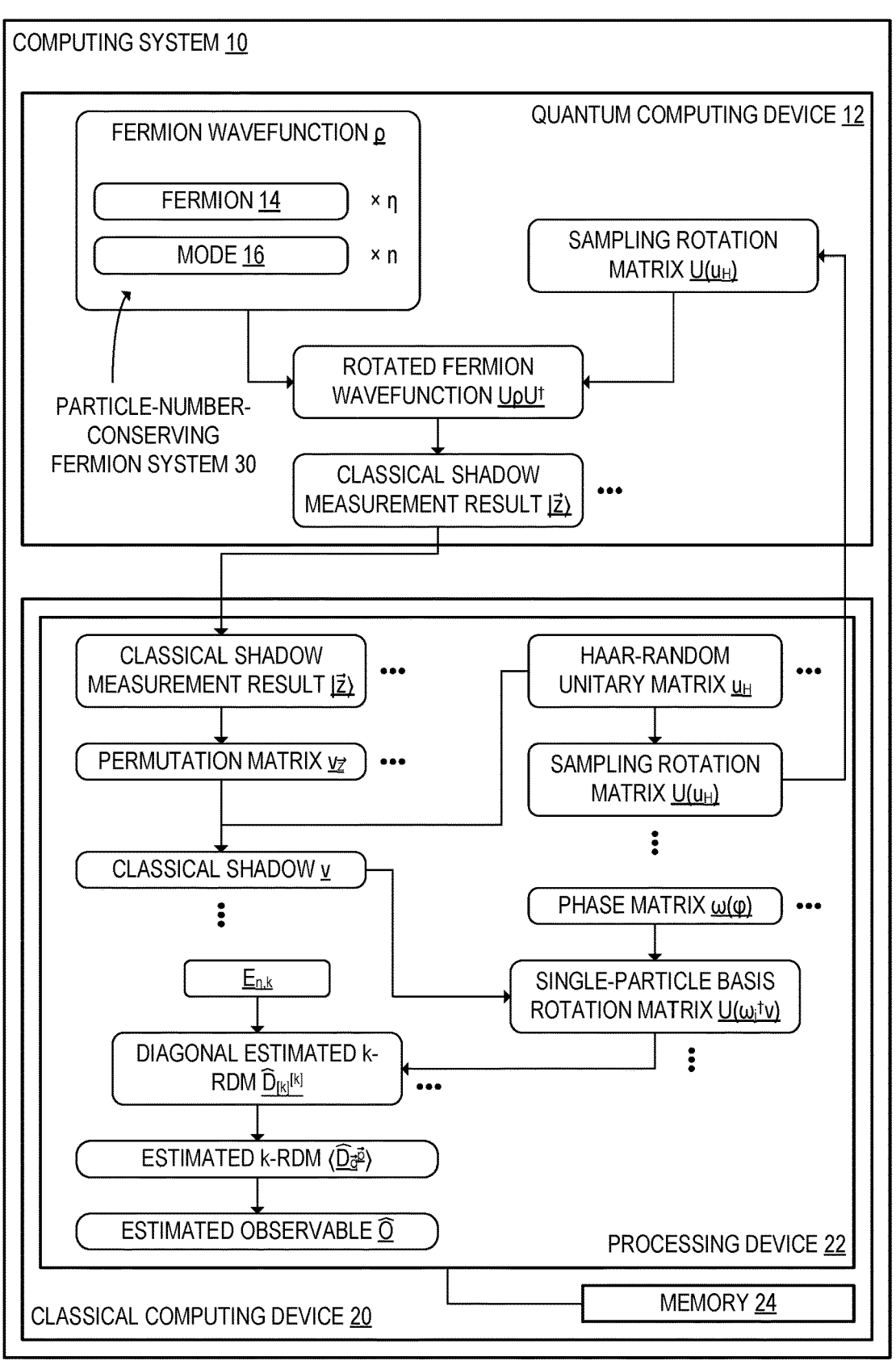
FIG. 1 schematically shows a computing system at which one or more processing devices are configured to compute an estimated k-RDM according to a conventional k-RDM estimation protocol.

FIG. 1 schematically shows a computing system 10 at which an estimated k-RDM $$\langle \hat{D}_{\vec{q}}^{\vec{p}} \rangle$$

is computed according to the prior protocol. The computing system 10 depicted in FIG. 1 includes a quantum computing device 12 that is configured to communicate with a classical computing device 20. The classical computing device 20 includes one or more processing devices 22 and memory 24.

As shown in the example of FIG. 1, the quantum computing device 12 receives a specification of a fermion wavefunction $\rho$ over $\eta$ fermions 14 in a particle-number-conserving fermion system 30 that occupy n modes 16. The fermions 14 may, for example, be electrons and atomic nuclei included in a molecule for which the fermion wavefunction $\rho$ is simulated. The specification of the fermion wavefunction $\rho$ may, for example, be received as an eigenstate of a Hamiltonian.

The one or more processing devices 22 are configured to compute the estimated k-RDMs $$\langle \hat{D}_{\vec{q}}^{\vec{p}} \rangle$$

as expectation values of a k-RDM operator $$\hat{D}_{\vec{q}}^{\vec{p}}.$$

In the previous protocol, the expectation values $$\langle \hat{D}_{\vec{q}}^{\vec{p}} \rangle$$

of the k-RDM operators $$\hat{D}_{\vec{q}}^{\vec{p}}$$

are estimated using classical shadow measurement results | $\vec{z}$). These classical shadow measurement results $|\vec{z}\rangle$ may be measured as observables of a rotated fermion wavefunction obtained by applying a sampling rotation $U(u_H)$ to the fermion wavefunction $\rho$. The sampling rotation $U(u_H)$ is a rotation in a single-particle basis. Given a unitary matrix $u_H$ sampled from the n×n Haar random distribution on the unitary group $U_n$, the sampling rotation $U(u_H)$ may be defined as rotating each creation operator $$a_k^\dagger$$

to a linear combination of other creation operators as follows:

$$U(u_H)a_k^\dagger U^\dagger(u_H) = \sum_j u_{kj}a_j^\dagger$$

The rotated fermion wavefunction may be given by $U\rho U^\dagger$. The sampling rotations $U(u_H)$ also have, within the $\eta$-particle subspace, matrix elements given by the following:

$$\forall \vec{x}, \vec{y} \in S_{n,\eta}, \langle \vec{x}|U(u_H)|\vec{y}\rangle = (\wedge^\eta u_H)_{\vec{x},\vec{y}} = \det[u_{\vec{x},\vec{y}}]$$

where $\wedge$ is the exterior product and $u_{\vec{x},\vec{y}}$ denotes the submatrix formed by taking rows $x_1, x_2, \ldots$ and columns $y_1, y_2, \ldots$ of $u_H$.

The quantum state of the rotated fermion wavefunction $U\rho U^\dagger$ may be measured in the computational basis to obtain a classical shadow measurement result $|\vec{z}\rangle$, as discussed above. The classical shadow measurement result $|\vec{z}\rangle$ may be obtained with the following probability:

$$Pr[|\vec{z}\rangle] = \langle\vec{z}|\, U(u_H)\rho U^\dagger(u_H)|\vec{z}\rangle$$

A permutation matrix that maps elements of $\vec{z}$ to $[\eta]$ may be defined as $v_{\vec{z}} \in \mathbb{Z}^{n\times n}$. Using this permutation matrix, a classical shadow may be computed as $v = v_{\vec{z}} U_H$.

Subsequently to computing the classical shadow $v$, an estimated k-RDM $$\langle \hat{D}_{\vec{q}}^{\vec{p}} \rangle$$

may be computed from the classical shadow $v$ using the following formula:

$$\left\langle \overline{D}_{\vec{q}}^{\vec{p}} \right\rangle = \langle\vec{q}|U_k^\dagger(v)E_{\eta,k}U_k(v)|\vec{p}\rangle$$

where $$E_{\eta,k} \doteq \sum_{\vec{r}\in S_{n,k}} |\vec{r}\rangle\langle\vec{r}| \frac{\binom{\eta-s'}{k-s'}\binom{n-\eta+s'}{s'}}{(-1)^{k+s'}\binom{k}{s'}}$$

The above equation for k-RDM $$\langle \hat{D}_{\vec{q}}^{\vec{p}} \rangle$$

involves matrix multiplication of dimension $$\binom{n}{k}\times\binom{n}{k}$$

matrices and is therefore inefficient for large values of k.

The previous protocol also includes a method of computing $$\langle \hat{D}_{\vec{q}}^{\vec{p}} \rangle$$

or any k. Hermitian combinations of k-RDMs may be defined as follows:

$$D_{\vec{q}}^{\vec{p}} = \frac{1}{2}\left(D_{\vec{q};0}^{\vec{p}} - iD_{\vec{q};\pi/2}^{\vec{p}}\right)$$

$$D_{\vec{q};\phi}^{\vec{p}} \doteq e^{i\phi}D_{\vec{q}}^{\vec{p}} + e^{-i\phi}D_{\vec{p}}^{\vec{q}}$$

Any Hermitian k-RDM $$D_{\vec{q};\phi}^{\vec{p}}$$

is a linear combination of at most two diagonal k-RDMs. For example, when $\vec{p}=[k]$ and $\vec{q}=[2k]\backslash[k]=(k+1 \ldots 2k)$, then:

$$D_{[2k]\backslash[k];\phi}^{[k]} = U(\omega(\phi))(\hat{n}_{[k]} - \hat{n}_{[2k]\backslash[k]})U^\dagger(\omega(\phi))$$

where $\omega(\phi)$ is a phase matrix defined as:

$$\omega(\phi) = \left(\frac{1}{\sqrt{2}}\begin{bmatrix} e^{i\phi/2}I_{[k]} & e^{i\phi/2}I_{[k]} \\ e^{-i\phi/2}I_{[k]} & e^{-i\phi/2}I_{[k]} \end{bmatrix}\right) \oplus I_{[n]\backslash[2k]}$$

and where $I_{\vec{x}} = \sum_{j\in\vec{x}}|j\rangle\langle j|$. Accordingly, $$D_{\vec{q};\phi}^{\vec{p}}$$

is a rotation of $$D_{\vec{q}}^{\vec{p}}$$

in the complex plane.

Any rotated k-RDM $$D_{\vec{q};\phi}^{\vec{p}}$$

may then be obtained by multiplying $\omega$ with a permutation that maps $[k]$ to $\vec{p}$ and $[2k]\backslash[k]$ to $\vec{q}$. The case where $\vec{p}$ and $\vec{q}$ have k' elements not in common is treated analogously by the replacement $(\hat{n}_{[k]}-\hat{n}_{[2k]\backslash[k]})\rightarrow(\hat{n}_{[k]}-\hat{n}_{[2k]\backslash[k]})\hat{n}_{[2k+k']\backslash[k']}$, since $$U(\omega)a_j^\dagger U(\omega)^\dagger = a_j^\dagger$$

acts as an identity on fermion operators with subscripts $j>2k$. In the above expressions, $\hat{n}_{[k]}=\hat{n}_1 \ldots \hat{n}_k$. Using this replacement, any k-RDM may be expressed as a linear combination of at most four diagonal estimated k-RDMs $$\hat{D}_{[k]}^{[k]}$$

conjugated by single-particle basis rotations $U(\omega_j)$, $$D_{\vec{q}}^{\vec{p}} = \sum_{j=1}^{4}\alpha_j U(\omega_j)\hat{D}_{[k]}^{[k]}U^\dagger(\omega_j)$$

where the $\omega_j$ are permutations of the sparse matrix $\omega(\phi)$.

In the previous protocol, the estimator for any k-RDM may be computed by combining the above equation for $$D_{\vec{q}}^{\vec{p}}$$

with an alternate expression for $$\langle \hat{D}_{\vec{q}}^{\vec{p}} \rangle$$

given by the following formula:

$$\left\langle U_k(\omega_j)\hat{D}_{[k]}^{[k]}U_k^\dagger(\omega_j) \right\rangle = Tr_k\left[\hat{n}_{[k]}U_k(\omega_j^\dagger v)E_{\eta,k}U_k^\dagger(\omega_j^\dagger v)\right]$$

where $$E_{\eta,k} \doteq \sum_{s=0}^{k} \frac{\binom{\eta-k+s}{s}\binom{n-\eta+k-s}{k-s}}{(-1)^{2k-s}\binom{k}{s}} Sim_{k,s}\left(\prod_{[\eta]}\right)$$

$$Sim_{k,s}\left(\prod_{[\eta]}\right) \doteq \sum_{j=0}^{k}(-1)^{j+s}\binom{j}{s}e_j(\hat{n}_1 \ldots \hat{n}_\eta) =$$

$$(-1)^s \sum_{\alpha=0}^{\eta} f_{k,s}(\alpha)i^\alpha e_j(\beta_1, \ldots, \beta_\eta)$$

$$f_{k,s}(\alpha) \doteq \sum_{j=\alpha}^{k}(-1)^j\binom{j}{s}\frac{1}{2^j}\binom{\eta-\alpha}{\eta-j}$$

The trace may be computed over the k-particle subspace, such that:

$$Tr_k[X] = \sum_{\vec{x}\in S_{n,k}} \langle\vec{x}|X|\vec{x}\rangle = Tr\left[\prod_k X\right]$$

where $\Pi_k$ projects onto the k-particle subspace. $\beta_j$ in the equation for $Sim_{k,s}(\Pi_{[\eta]})$ is a Majorana bivector, as discussed below. In the above equations, $e_j$ are elementary symmetric polynomials. The elementary symmetric polynomials of degree k in d commuting variables are defined as follows:

$$e_k(X_1, \ldots, X_d) \doteq \sum_{\vec{z}\in S_{d,k}} X_{z_1} \ldots X_{z_k}$$

In addition, any element of the matrix product $$\omega_j^\dagger v$$

may be computed using $\mathcal{O}$ (1) arithmetic operations without matrix multiplication, since $\omega(\phi)$ is sparse and $$\omega_j^\dagger$$

is $\omega(\phi)$ times some permutation.

Figure 2:
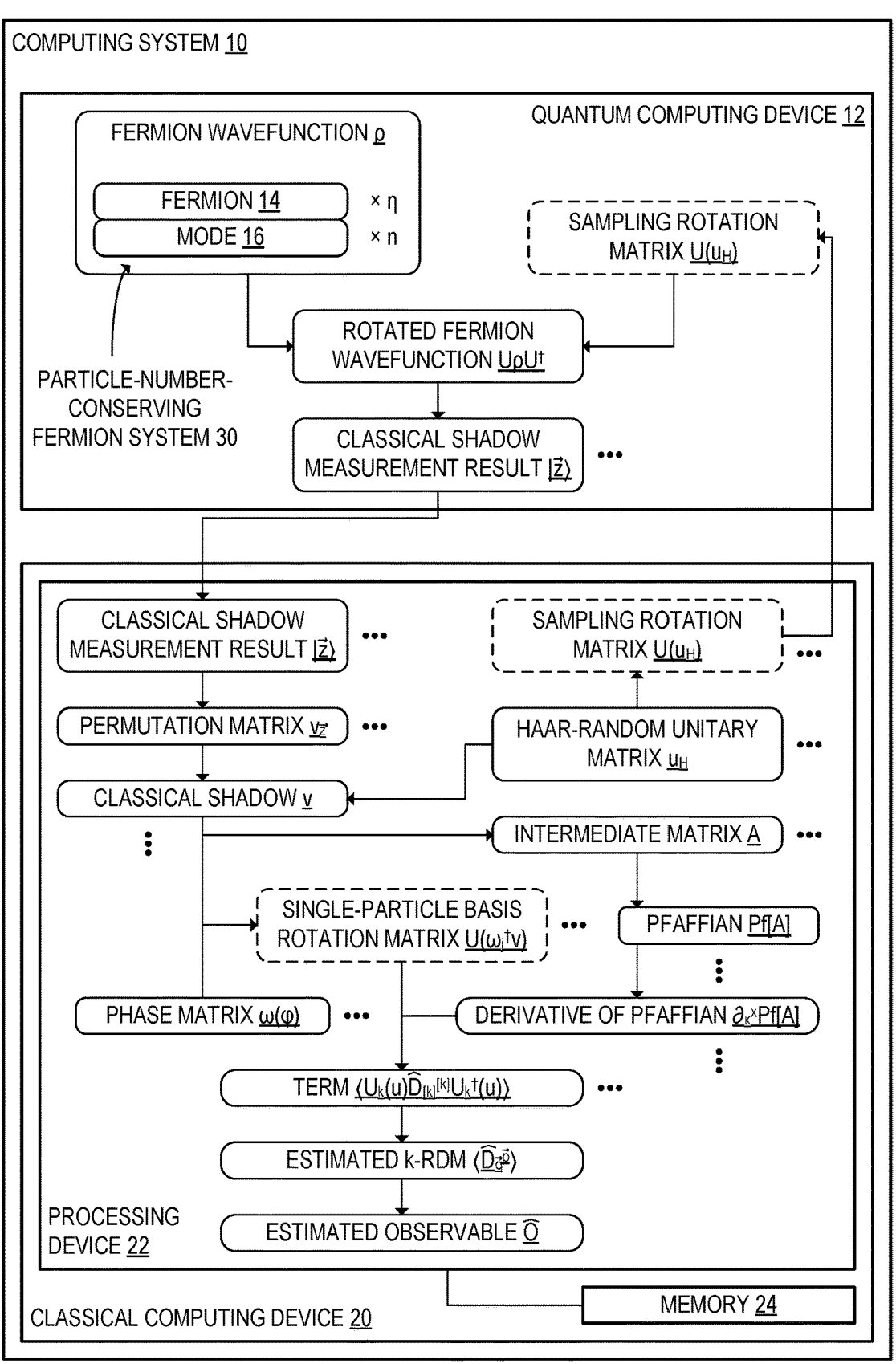
FIG. 2 schematically shows a computing system at which one or more processing devices are configured to compute an estimated k-RDM using an approach that has a lower time complexity than the conventional k-RDM estimation protocol.

Systems and methods of computing the estimated k-RDM $$\langle \hat{D}_{\vec{q}}^{\vec{p}} \rangle$$

with higher computational efficiency are provided below. FIG. 2 schematically shows the computing system 10 when the one or more processing devices 22 are configured to compute an estimated k-RDM $$\langle \hat{D}_{\vec{q}}^{\vec{p}} \rangle$$

of a k-RDM operator $$\hat{D}_{\vec{q}}^{\vec{p}}$$

according to this more efficient approach. From each measurement of the quantum state, the following systems and methods allow any k-RDM to be estimated in $\mathcal{O}$ ($k^2\eta$) time. This increase in efficiency is particularly significant in examples in which k-RDM estimates are computed a large number of times.

The one or more processing devices 22 of the classical computing device 20 are configured to receive a plurality of classical shadow measurement results $|\vec{z}\rangle$ associated with a fermion wavefunction ρ, as in the previous approach. The fermion wavefunction ρ describes a plurality of fermions 14 in a particle-number-conserving fermion system 30 that occupy a plurality of modes 16. The number of fermions is given by η and the number of modes 16 is given by n. Using the classical shadow measurement results $|\vec{z}\rangle$, the one or more processing devices 22 are further configured to compute an estimated k-RDM $$\langle \hat{D}_{\vec{q}}^{\vec{p}} \rangle,$$

where k is a number of ladder operator pairs (pairs of fermion creation and annihilation operators) that are used to define the k-RDM. The estimated k-RDM $$\langle \hat{D}_{\vec{q}}^{\vec{p}} \rangle$$

may, as in the previous approach, be computed as an expectation value of a k-RDM operator $$\hat{D}_{\vec{q}}^{\vec{p}}.$$

In the following discussion of the higher-efficiency approach to computing estimated k-RDMs $$\langle \hat{D}_{\vec{q}}^{\vec{p}} \rangle,$$

the Majorana fermion representation $\gamma_p$ of regular fermions is used. The Majorana representation $\gamma_p$ has the following properties:

$$a_p = \frac{\gamma_{2p-1} + i\gamma_{2p}}{2}$$

$$a_p^\dagger = \frac{\gamma_{2p-1} - i\gamma_{2p}}{2}$$

$$\hat{n}_j = \frac{1}{2}(1 + i\beta_j)$$

$$\beta_j \doteq \gamma_{2j-1}\gamma_{2j}$$

In the above equations, $\alpha_p$ is an annihilation operator, $$a_p^\dagger$$

is a creation operator, $\hat{n}_j$ is a number operator, and $\beta_j$ is a Majorana bivector. Thus, the one or more processing devices 22 are configured to compute the plurality of Majorana bivectors $\beta_j$ as products of pairs of Majorana representations $\gamma_p$ of the fermions 14.

For each of the classical shadow measurement results $|\vec{z}\rangle$, the computation of the estimated k-RDM $$\langle \hat{D}_q^{\vec{p}} \rangle$$

may utilize a single-particle basis rotation matrix $$U(\omega_j^\dagger v)$$

that is dependent upon the classical shadow measurement result $|\vec{z}\rangle$, as discussed in further detail below. When computing terms of the estimated k-RDM, the one or more processing devices 22 may be configured to compute the single-particle basis rotation matrix $$U(\omega_j^\dagger v)$$

implicitly, as discussed below. Accordingly, the one or more processing devices 22 may avoid having to explicitly compute the single-particle basis rotation matrix, which may have a size of $$\binom{n}{k} \times \binom{n}{k} \text{ or } \binom{n}{\eta} \times \binom{n}{\eta}.$$

For each of the plurality of classical shadow measurement results $|\vec{z}\rangle$, the one or more processing devices 22 may be configured to compute a permutation matrix $v_{\vec{z}} \in \mathbb{Z}^{n \times n}$ that maps elements of the classical shadow measurement result $|\vec{z}\rangle$ to the fermions 14 included in the particle-number-conserving fermion system 30. In addition, the one or more processing devices 22 may be further configured to sample a unitary matrix $u_H$ from a Haar random distribution. As in the previous approach shown in FIG. 1, the Haar random distribution may be the n×n Haar random distribution on the unitary group $U_n$.

When generating each of the classical shadow measurement results $|\vec{z}\rangle$, the one or more processing devices 22 may be further configured to utilize a sampling rotation matrix $U(u_H)$ that encodes a rotation by the unitary matrix $u_H$. The one or more processing devices 22 may be further configured to sample each of the classical shadow measurement results $|\vec{z}\rangle$ based at least in part on the fermion wavefunction $\rho$ and on the sampling rotation matrix $U(u_H)$. Since the sampling rotation matrix $U(u_H)$ may have a size of $$\binom{n}{k} \times \binom{n}{k} \text{ or } \binom{n}{\eta} \times \binom{n}{\eta},$$

the one or more processing devices 22 may be configured to compute the sampling rotation matrix $U(u_H)$ implicitly when computing the classical shadow measurement results $|\vec{z}\rangle$ rather than explicitly computing the sampling rotation matrix $U(u_H)$. When the classical shadow measurement results $|\vec{z}\rangle$ are sampled, as shown in FIG. 2, the rotations encoded in the corresponding sampling rotation matrices $U(u_H)$ may be applied to the fermion wavefunction $\rho$ at the quantum computing device 12 to generate a rotated fermion wavefunction $U\rho U^\dagger$ from which the classical shadow measurement results $|\vec{z}\rangle$ are sampled. Although the example of FIG. 2 samples the classical shadow measurement $|\vec{z}\rangle$ results from a quantum computing device 12, the fermion wavefunction $\rho$ may instead be simulated at a classical analog simulator in other examples.

The one or more processing devices 22 may be further configured to compute the classical shadow v as a product of the permutation matrix $v_{\vec{z}}$ and the unitary matrix $u_H$, such that $v = v_{\vec{z}} u_H$. The classical shadows v may accordingly be computed as discussed above with reference to the previous approach.

The one or more processing devices 22 may be further configured to compute a rotated unitary matrix $$\omega_j^\dagger v$$

as a product of a phase matrix $$\omega_j^\dagger$$

and the classical shadow v. The phase matrix $$\omega_j^\dagger$$

in this example is the conjugate transpose of the phase matrix $\omega(\phi)$ discussed above. Accordingly, in this example, the one or more processing devices 22 are further configured to compute the phase matrix $$\omega_j^\dagger$$

based at least in part on the number of ladder operator pairs k, the total number of modes n, and a randomly selected phase angle φ.

The single-particle basis rotation matrix $$U(\omega_j^\dagger v)$$

encodes a rotation by the rotated unitary matrix $$\omega_j^\dagger v.$$

In the following discussion, $$\omega_j^\dagger v$$

is indicated as u, such that the single-particle basis rotation matrix $$U(\omega_j^\dagger v)$$

is represented as U(u). In the Majorana representation, the single-particle basis rotation matrix U(u) rotates Majorana operators to other linear combination of Majorana operators:

$$U(u)\gamma_p U^\dagger(u) = \sum_q \tilde{u}_{p,q}\gamma_q$$

where $$\tilde{u} = \mathrm{Re}[u] \otimes \begin{pmatrix} 1 & 0 \\ 0 & 1 \end{pmatrix} + \mathrm{Im}[u] \otimes \begin{pmatrix} 0 & 1 \\ -1 & 0 \end{pmatrix}$$

The matrices in the above equation for ũ may be indicated as follows:

$$\begin{pmatrix} 1 & 0 \\ 0 & 1 \end{pmatrix} = I_{[2]}$$

$$\begin{pmatrix} 0 & 1 \\ -1 & 0 \end{pmatrix} = Y$$

Using the indexing $\gamma_{p,x} = \gamma_{2p+x-1}$, the consistency of the Majorana representation with the above definition of the single-particle basis rotation may be verified as follows:

$$U(u)a_q^\dagger U^\dagger(u) = U(u)\frac{\gamma_{p,0} - i\gamma_{p,1}}{2}U^\dagger(u)$$

$$= \frac{1}{2}\sum_q \mathrm{Re}[u]_{p,q}\gamma_{q,0} + \mathrm{Im}[u]_{p,q}\gamma_{q,1} - i\left(\mathrm{Re}[u]_{p,q}\gamma_{q,1} - \mathrm{Im}[u]_{p,q}\gamma_{q,0}\right)$$

$$= \frac{1}{2}\sum_q \left(\mathrm{Re}[u]_{p,q} + i\mathrm{Im}[u]_{p,q}\right)\gamma_{q,0} - i\left(\mathrm{Re}[u]_{p,q} + i\mathrm{Im}[u]_{p,q}\right)\gamma_{q,1}$$

$$= \frac{1}{2}\sum_q u_{p,q}(\gamma_{q,0} - i\gamma_{q,1}) = \sum_q u_{p,q}a_q^\dagger$$

Given a real orthogonal matrix $R \in \mathcal{O}_{2n}$, the fermion operator $\gamma_p$ and the single-particle basis rotation matrix U(R) associated with the real orthogonal matrix R satisfy the following property:

$$U(R)\gamma_p U^\dagger(R) = \sum_q R_{p,q}\gamma_q$$

where $R_{p,q}$ are coefficients of the terms of the rotated fermion operator $U\gamma_p U^\dagger$.

Computing the estimated k-RDM includes computing a plurality of traces as terms of the estimated k-RDM $$\langle \hat{D}_{\vec{q}}^{\vec{p}} \rangle.$$

The terms $$\left\langle U_k(u)\hat{D}_{[k]}^{[k]}U_k^\dagger(u) \right\rangle$$

of the estimated k-RDM $$\langle \hat{D}_{\vec{q}}^{\vec{p}} \rangle,$$

(where the notation is simplified by absorbing $\omega_j$ into u) are linear combinations of the traces of various degrees of elementary symmetric polynomials of Majorana bivectors:

$$\left\langle U_k(u)\hat{D}_{[k]}^{[k]}U_k^\dagger(u) \right\rangle = \sum_{j=0}^k \alpha_{n,\eta,k,j}Tr_k\left[\hat{n}_{[k]}U_k(u)e_j(\beta_1, \ldots, \beta_\eta)U_k^\dagger(u)\right]$$

with some coefficients $\alpha_{n,\eta,k,j}$. Accordingly, the traces computed as terms of the estimated k-RDM are computed as traces of respective products of a number operator $\hat{n}_{[k]}$ of the particle-number-conserving fermion system 30, the single-particle basis rotation matrix $U_k(u)$, the plurality of elementary symmetric polynomials $e_j$ of a plurality of Majorana bivectors $\beta_j$ respectively associated with the plurality of fermions 14, and the conjugate transpose $$U_k^\dagger(u)$$

of the single-particle basis rotation matrix $U_k$ (u). The plurality of elementary symmetric polynomials $e_j$ of the plurality of Majorana bivectors $\beta_j$ may include the elementary symmetric polynomials with integer degrees j=0, . . . , η.

As discussed above, the estimated k-RDM $$\langle \hat{D}_{\vec{q}}^{\vec{p}} \rangle$$

may be computed as a sum of four or fewer terms $$\left\langle U_k(u)\hat{D}_{[k]}^{[k]}U_k^\dagger(u)\right\rangle$$

with corresponding coefficients. The speedup in the computation of the terms $$\left\langle U_k(u)\hat{D}_{[k]}^{[k]}U_k^\dagger(u)\right\rangle$$

arises from a faster method for computing traces of the following form:

$$Tr_r[\hat{n}_{[k]}U(u)e_j(\beta_1, \dots, \beta_\eta)U^\dagger(u)]$$

concurrently for each of the elementary symmetric polynomials j=0, . . . , η of the Majorana bivectors $\beta_j$. Once the traces are computed, each term $$\left\langle U_k(u)\hat{D}_{[k]}^{[k]}U_k^\dagger(u)\right\rangle$$

may be obtained by computing an appropriate linear combination of the traces.

Figure 3:
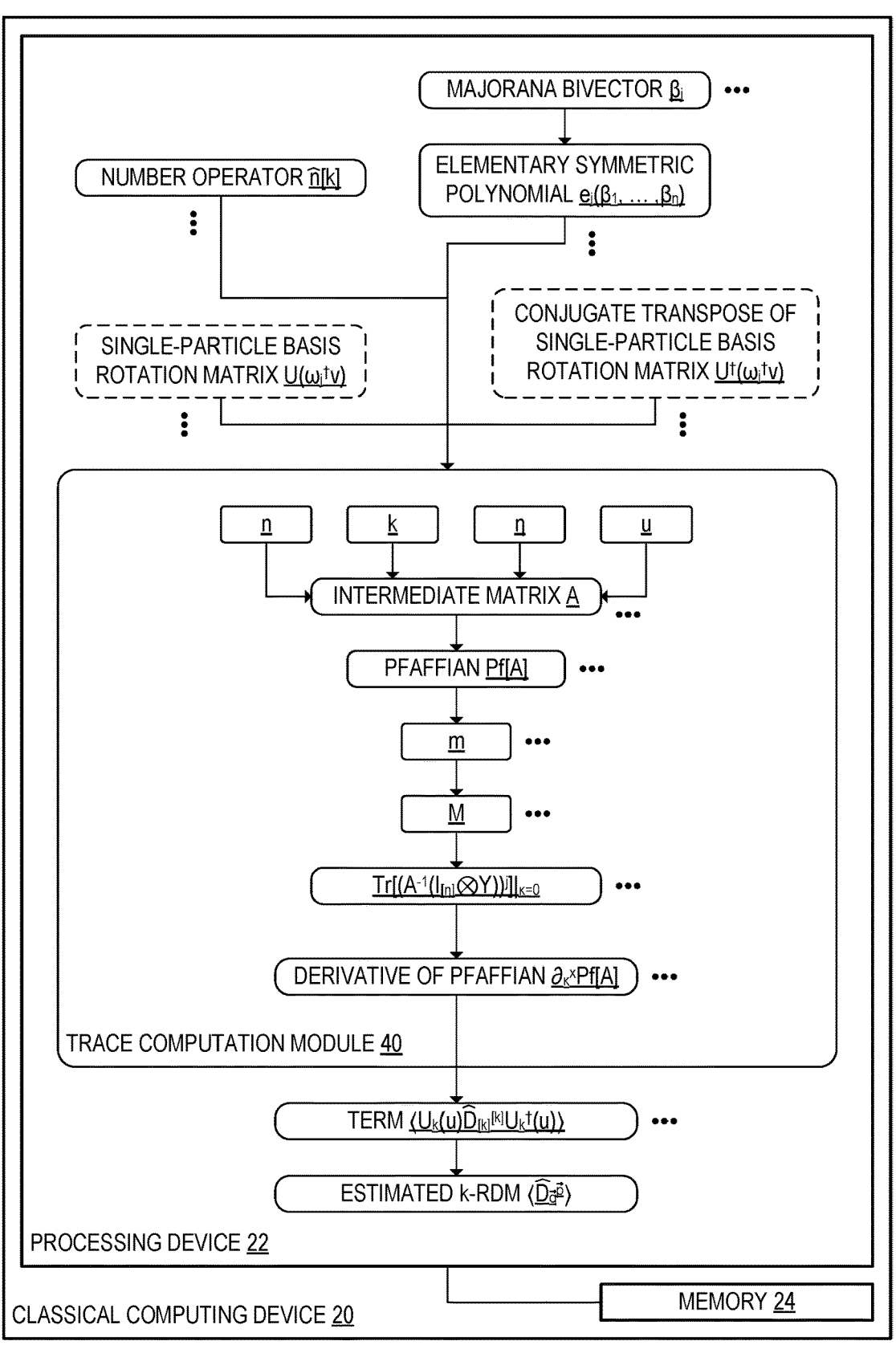
FIG. 3 schematically shows the one or more processing devices when a plurality of terms of the estimated k-RDM are computed at least in part by computing a plurality of traces, according to the example of FIG. 2.

FIG. 3 schematically shows the classical computing device 20 when the one or more processing devices 22 are configured to compute a plurality of rotated diagonal estimated k-RDM terms $$\left\langle U_k(u)\hat{D}_{[k]}^{[k]}U_k^\dagger(u)\right\rangle.$$

The one or more processing devices 22, as shown in the example of FIG. 3, are configured to execute a trace computation module 40 at which the traces $Tr_k[\hat{n}_{[k]}U(u)e_j(\beta_1, \dots, \beta_\eta)U^\dagger(u)]$ are computed. A plurality of additional traces may also be computed at the trace computation module 40 when computing the terms $$\left\langle U_k(u)\hat{D}_{[k]}^{[k]}U_k^\dagger(u)\right\rangle,$$

as discussed in further detail below.

The inner product $Tr_k[\hat{n}_{[k]}U(u)e_j(\beta_1, \dots, \beta_\eta)U^\dagger(u)]$ may be inferred from $\mathcal{O}(n)$ calculations of fermionic linear optics. Fermionic linear optics is related to the strong simulability of matchgate circuits and non-interacting fermion distributions and is known to be possible in polynomial time $\mathcal{O}(\text{poly}(n))$. However, the approach discussed below is significantly faster.

Given any real anti-symmetric matrix M, which has block-diagonal form $$M = R[\bigoplus_{j\in[n]}\lambda_j Y]R^T, R \in SO_{2n}$$

the fermionic gaussian may be defined as follows:

$$\rho(M) = \exp\left[\frac{i}{2}\sum_{j,k\in[2n]}\theta_j M_{j,k}\theta_k\right] = U(R)\prod_{j\in[n]}(1 + i\lambda_j\beta_j)U^\dagger(R)$$

The trace of two products of fermionic gaussians evaluates to a Pfaffian as follows:

$$Tr[XY] = (-2)^n\int D\theta D\mu e^{\theta^T u}\omega(X, \theta)\omega(Y, \mu)$$

$$Tr[\rho(M)\rho(K)] = (-2)^n\int D\theta D\mu e^{\theta^T u}\omega(M, \theta)\omega(K, \mu)$$

$$= (-2)^n\int D\theta D\mu e^{\theta^T u}e^{\frac{i}{2}\theta^T M\theta}e^{\frac{i}{2}\mu^T K\mu}$$

$$= (-2)^n\int D\theta D\mu e^{\theta^T u + \frac{i}{2}\mu^T K\mu}e^{\frac{i}{2}\theta^T M\theta}$$

$$= (-2)^n i^n Pf(K)\int D\theta e^{\frac{i}{2}\theta^T(-K^{-1}+M)\theta} = 2^n Pf(K)Pf(M - K^{-1})$$

$$= 2^n Pf(M)2^n Pf(K - M^{-1})$$

In a first step performed when computing the trace $Tr_k[\hat{n}_{[k]}U(u)e_j(\beta_1, \dots, \beta_\eta)U^\dagger(u)]$, the inner product $\hat{n}_{[k]}U(u)e_j(\beta_1, \dots, \beta_\eta)U^\dagger(u)$ in the above expression may be converted into an evaluation of at most 72 fermionic linear optics expressions $Tr[\rho(M)\rho(K)]$ for some M and K. In a second step, the η fermionic linear optics expressions may be evaluated in a combined manner to obtain the value of the trace.

In the first step, any operator X, the trace $Tr_k[\hat{n}_{[k]}X]=Tr_k[\rho_k X]$ over k particles is equal to the trace over all particles times a fermionic gaussian $\rho_k$. An invertible matrix $\wedge$ may be defined as follows:

$$\Lambda = I_{[k]} - I_{[n]\backslash[k]} = I_{[n]} - 2I_{[n]\backslash[k]} = 2I_{[k]} - I_{[n]}$$

where $I_{[k]}$ is an identity matrix with k rows and columns. From the definition of the fermionic gaussian, $$\rho_k \doteq \rho(\Lambda \otimes y) = 2^n\prod_{j=1}^{k}\hat{n}_j\prod_{j=k+1}^{n}(1 - \hat{n}_j)$$

which implies $$Tr_k[\hat{n}_{[k]}X] = Tr\left[\hat{n}_{[k]}\prod_{j\in[n]\backslash[k]}(1 - \hat{n}_j)X\right] = Tr[\rho_k X]$$

The use of a fermionic gaussian in the above identity is a significant simplification over the previous approach, which instead inserted a generic projector $\Pi_k$ onto the k-particle subspace as $Tr_k[\hat{n}_{[k]}X]=Tr[\Pi_k\hat{n}_{[k]}X]$. In contrast, in the current approach, $Tr_k[\hat{n}_{[k]}X]=Tr[\Pi_k X]$.

The fermionic gaussian itself is a generating function for the elementary symmetric polynomials:

$$\rho(M) = U(R)\prod_{j=1}^{n}(1 + i\kappa\lambda_j\beta_j)U^{\dagger}(R) = U(R)\sum_{j=0}^{n}(i\kappa)^j e_j(\lambda_1\beta_1, \ldots,$$

$$\lambda_n\beta_n)U^{\dagger}(R)$$

Thus, the following fermonic gaussian is a linear combination of the elementary symmetric polynomials $e_j$ ($\beta_1, \ldots, \beta_\eta$):

$$\rho_\eta(\kappa) \doteq \rho(\kappa I_{[n]} \otimes y) = \sum_{j=0}^{\eta}(i\kappa)^j e_j(\beta_1, \ldots \beta_\eta)$$

A single evaluation of $$Tr[\rho_k U_k(u)\rho_\eta(\kappa)U_k^{\dagger}(u)] = \sum_{j=0}^{\eta}(i\kappa)^j Tr_k[U(u)\hat{n}_{[k]}U^{\dagger}(u)e_j(\beta_1, \ldots \beta_\eta)]$$

is therefore equal to a linear combination of the traces $Tr_k[\hat{n}_{[k]}U(u)e_j(\beta_1, \ldots, \beta_\eta)U^{\dagger}(u)]$. Evaluating $$Tr[\rho_k U_k(u)\rho_\eta(\kappa)U_k^{\dagger}(u)]$$

on $\mathcal{O}(n)$ different values of $\kappa$ then provides enough information to compute all the traces $Tr_k[\Pi_{[k]}U(v)e_j(\hat{n}_1, \ldots, \hat{n}_\eta)U^{\dagger}(v)]$, e.g., by polynomial interpolation.

In the second step, rather than computing the traces $Tr_k$ $[\hat{n}_{[k]}U(u)e_j(\beta_1, \ldots, \beta_\eta)U^{\dagger}(u)]$ via polynomial interpolation, a faster approach may instead be used. The traces may be expressed as Pfaffians of appropriately defined matrices:

$$Tr[\rho_k U_k(u)\rho_\eta(\kappa)U_k^{\dagger}(u)] = Tr[\rho(\Lambda \otimes Y)\rho(\kappa \tilde{u}I_{[\eta]} \otimes Y\tilde{u}^T)]$$

$$= Tr[\rho(\tilde{u}^T\Lambda \otimes Y\tilde{u})\rho(\kappa I_{[\eta]} \otimes Y)]$$

$$= 2^n Pf[\tilde{u}^T\Lambda \otimes Y\tilde{u}]Pf[\kappa I_{[\eta]} \otimes Y - \tilde{u}^T\Lambda \otimes Y\tilde{u}]$$

$$= 2^n(-1)^{n-k}Pf[A(\kappa)]$$

where $$A(\kappa) \doteq \kappa I_{[\eta]} \otimes Y - \tilde{u}^T\Lambda \otimes Y\tilde{u}$$

Thus, the Pfaffian used to compute the traces is a Pfaffian of an intermediate matrix $A(\kappa)$, which the one or more processing devices 22 are configured to compute based at least in part on the rotated unitary matrix $$\omega_j^{\dagger}v,$$

the total number $\eta$ of the plurality of fermions 14, the total number n of the plurality of modes 16, and the number of ladder operator pairs k.

Computing each of the traces includes iteratively computing a plurality of derivatives of the Pfaffian Pf[A]. By taking high-order derivatives with respect to K, the traces corresponding to specific elementary symmetric polynomials may be isolated. For example, the following derivative may be computed:

$$\partial_k^x Tr[\rho_k U_k(u)\rho_\eta(\kappa)U_k^{\dagger}(u)]|_{\kappa=0} = x!\, i^x Tr_k[\hat{n}_{[k]}U(u)e_x(\beta_1, \cdots \beta_\eta)U^{\dagger}(u)]$$

Accordingly, the trace may be computed for each of the elementary symmetric polynomials $e_j$ for $j=0, \ldots, \eta$. The one or more processing devices 22 may be configured to compute the derivatives of the Pfaffian Pf[A] with integer orders $x=1, \ldots, \eta$.

An efficient method of computing the derivatives the Pfaffian Pf[A(K)] is provided below. The derivatives of a Pfaffian in general are given by:

$$\partial Pf(A) = \frac{1}{2}Pf(A)Tr[A^{-1}\partial A]$$

For the intermediate matrix A discussed above, the derivatives are:

$$\partial_\kappa Pf(A) = \frac{1}{2}Pf(A)Tr[A^{-1}(I_{[\eta]} \otimes Y)]$$

$$\partial_\kappa^2 Pf(A) =$$

$$\frac{1}{2}\partial_\kappa Pf(A)Tr[A^{-1}(I_{[\eta]} \otimes Y)] - \frac{1}{2}Pf(A)Tr[A^{-1}(I_{[\eta]} \otimes Y)A^{-1}(I_{[\eta]} \otimes Y)]$$

$$\cdots$$

$$\partial_\kappa^x Pf(A) = \frac{1}{2}\sum_{j=0}^{x-1}\binom{x-1}{j}\partial_\kappa^{x-j-1}(-1)^j Pf(A)Tr[(A^{-1}(I_{[\eta]} \otimes Y))^{j+1}]$$

This recursive computation allows the one or more processing devices 22 to compute higher-order derivatives from lower-order derivatives. Assuming that all the traces $Tr[(A^{-1}(I_{[\eta]}\otimes Y))^j]|_{\kappa=0}$ have been computed, the recursive computation of each of the derivatives $$\forall x \in [\eta],\, \partial_\kappa^x Pf(A)|_{\kappa=0}$$

may be performed in $\mathcal{O}(\eta^2)$ time.

The one or more processing devices 22 are further configured to compute the traces included in the above equation for the derivatives $$\partial_\kappa^x Pf(A)$$

of the Pfaffian. As a base case for the intermediate matrix, $$A(0) = A^{-1}(0) = -\tilde{u}^T\Lambda \otimes Y\tilde{u}$$

Hence, the trace is given by:

$$Tr\big[(A^{-1}(I_{[\eta]}\otimes Y))^j\big]\big|_{\kappa=0} = Tr\big[((-\tilde{u}^T\Lambda\otimes Y\tilde{u})(I_{[\eta]}\otimes Y))^j\big]$$

$$= (-1)^j Tr\big[((\Lambda\otimes Y)(\tilde{u}I_{[\eta]}\otimes Y\tilde{u}^T))^j\big]$$

The trace $Tr[(A^{-1}(I_{[\eta]}\otimes Y))^j]|_{\kappa=0}$ may be computed at least in part by computing each of the eigenvalues of $(\Lambda\otimes Y)$ $(\tilde{u}I_{[\eta]}\otimes Y\tilde{u}^T)$.

Computing eigenvalues of a 2n×2n matrix has a time complexity of $\mathcal{O}(n^\omega)$ and enables straightforward computation of the trace. Such an approach may be used in the non-particle-conserving case. However, when particle number is conserved, the above computation of the trace may be reduced to finding the eigenvalues of an even smaller 2k×2k matrix. Using the identity $\Lambda=2I_{[k]}-I_{[n]}$, the trace may be computed as follows:

$$Tr\big[(A^{-1}(I_{[n]}\otimes Y))^j\big]\big|_{\kappa=0} = (-1)^j\big[((\tilde{u}^T(2I_{[k]}-I_{[n]})\otimes Y\tilde{u})(I_{[\eta]}\otimes Y))^j\big]$$

$$= (-1)^j\big[(2(\tilde{u}^T I_{[k]}\otimes Y\tilde{u})(I_{[\eta]}\otimes Y) -$$

$$(\tilde{u}^T I_{[n]}\otimes Y\tilde{u})(I_{[\eta]}\otimes Y))^j\big]$$

The following identities may be used to simplify the computation of the above trace:

$$(\tilde{u}^T I_{[n]}\otimes Y\tilde{u})(I_{[\eta]}\otimes Y) = (Re[u]^T\otimes I_{[2]} - Im[u]^T\otimes Y)(I_{[n]}\otimes Y)$$

$$(Re[u]\otimes I_{[2]} + Im[u]\otimes Y)(I_{[\eta]}\otimes Y)$$

$$= (Re[u]^T\otimes Y + Im[u]^T\otimes I_{[2]})$$

$$(Re[u]\otimes I_{[2]} + Im[u]\otimes Y)(I_{[\eta]}\otimes Y)$$

$$= (Re[u]^T Re[u]\otimes Y - Re[u]^T Im[u]\otimes$$

$$I_{[2]} + Im[u]^T Re[u]\otimes I_{[2]} + Im[u]^T Im[u]\otimes Y)$$

$$(I_{[\eta]}\otimes Y) = (I_{[\eta]}\otimes Y)(I_{[\eta]}\otimes Y)$$

$$= -I_{[\eta]}\otimes I_{[2]}$$

In addition, $$(\tilde{u}^T I_{[k]}\otimes Y\tilde{u})(I_{[\eta]}\otimes Y) = (Re[u]^T\otimes I_{[2]} - Im[u]^T\otimes Y)(I_{[k]}\otimes Y)$$

$$(Re[u]\otimes I_{[2]} + Im[u]\otimes Y)(I_{[\eta]}\otimes Y)$$

$$= (Re[u]^T\otimes Y + Im[u]^T\otimes I_{[2]})$$

$$(I_{[k]}\otimes I_{[2]})(Re[u]\otimes Y - Im[u]\otimes I_{[2]})$$

$$(I_{[\eta]}\otimes I_{[2]}) = -(\tilde{a}^T I_{[k]}\otimes I_{[2]}\tilde{a}u)(I_{[\eta]}\otimes I_{[2]})$$

where $$\tilde{a}u = -Im[u]\otimes I_{[2]} + Re[u]\otimes Y$$

Using the above identities, the binomial expansion, and the cyclic property of the trace, $Tr[(A^{-1}(I_{[\eta]}\otimes Y))^j]|_{\kappa=0}$ may be computed as follows:

$$Tr\big[(A^{-1}(I_{[\eta]}\otimes Y))^j\big]\big|_{\kappa=0} = (-1)^j Tr\big[(-2((\tilde{a}u)^T I_{[k]}\otimes I_{[2]}\tilde{a}u)$$

$$(I_{[\eta]}\otimes I_{[2]}) + I_{[\eta]}\otimes I_{[2]})^j\big]$$

-continued $$= (-1)^j\sum_{y=0}^{j}(-2)^y\binom{j}{y}Tr[I_{[\eta]}\otimes$$

$$I_{[2]}[(\tilde{a}u)^T I_{[k]}\otimes I_{[2]}\tilde{a}u)(I_{[\eta]}\otimes I_{[2]})]^y]$$

$$= (-1)^j\Big[Tr[I_{[\eta]}\otimes I_{[2]}] + \sum_{y=1}^{j}(-2)^y\binom{j}{y}Tr$$

$$[(\tilde{a}u)^T I_{[k]}\otimes I_{[2]}\tilde{a}u)(I_{[\eta]}\otimes I_{[2]})]^y]$$

$$= (-1)^j\Big[2\eta + \sum_{y=1}^{j}(-2)^y\binom{j}{y}$$

$$Tr[[(I_{[k]}\otimes I_{[2]})(\tilde{a}u I_{[\eta]}\otimes I_{[2]}\tilde{a}u^T)]^y]\Big]$$

A matrix M within the trace in the above equation may be defined as:

$$M = (I_{[k]}\otimes I_{[2]})(\tilde{a}u I_{[\eta]}\otimes I_{[2]}\tilde{a}u^T)$$

The matrix M is non-zero on only a 2k×2k block. M may be rewritten as $M=m\cdot m^T$, where $$m = (I_{[k]}\otimes I_{[2]})(\tilde{a}u I_{[\eta]}\otimes I_{[2]})$$

is a 2k×2η submatrix of $\tilde{a}u$. Thus, M may be obtained by matrix multiplication of a 2k×2η matrix with a 2η×2k matrix, which has a time complexity of $\mathcal{O}(k^2\eta^\alpha)$ for some matrix multiplication exponent $\alpha\leq 1$.

Subsequently to computing the matrix M, the one or more processing devices 22 may be further configured to compute each of the nonzero eigenvalues of M with a time complexity of $\mathcal{O}(k^\omega)$. The one or more processing devices 22 may be further configured to compute each of the powers of the eigenvalues of M (such as by repeated squaring) in $\mathcal{O}(\eta k)$ multiplications, thereby allowing each of the traces $Tr[M^y]$ for $y\in[\eta]$ to be computed with an overall time complexity of $\mathcal{O}(k^2\eta^\alpha + k^\omega + \eta k)$. Using a cubic-time algorithm for matrix multiplication, the traces $Tr[M^y]$ may be computed with a time complexity of $\mathcal{O}(k^2\eta)$, which is dominated by the time spent forming M.

Once the traces $Tr[M^y]$ have been computed, the one or more processing devices 22 may be further configured to recursively compute the traces $Tr[(A^{-1}(I_{[\eta]}\otimes Y))^j]|_{\kappa=0}$ for $j\in[\eta]$ with a time complexity of $\mathcal{O}(\eta^2)$. Accordingly, computing the derivatives $$\partial_\kappa^x Pf(A)$$

of the Pfaffian may have an overall time complexity of $\mathcal{O}(\eta^2 + k^2\eta)$. The computation of the derivatives of the Pfaffian may be the highest-time-complexity step of the k-RDM estimation. Accordingly, the one or more processing devices 22 may be configured to compute the estimated k-RDM with a time complexity of $\mathcal{O}(\eta^2 + k^2\eta)$.

Subsequently to computing the estimated k-RDM $$\langle\hat{D}_{\vec{q}}^{\vec{p}}\rangle,$$

the one or more processing devices 22 are further configured to output the estimated k-RDM $$\langle \hat{D}_{\vec{q}}^{\vec{p}} \rangle$$

to an additional computing process. At the additional computing process, the one or more processing devices 22 may be further configured to estimate an observable O of the fermion wavefunction based at least in part on the estimated k-RDM $$\langle \hat{D}_{\vec{q}}^{\vec{p}} \rangle.$$

The one or more processing devices 22 may, for example, be configured to compute the estimated observable Ô as a linear combination of a plurality of estimated k-RDMs $$\langle \hat{D}_{\vec{q}}^{\vec{p}} \rangle.$$

FIG. 4A shows a flowchart of a method 100 for use with a computing device to compute an estimated k-RDM. The computing device may include a classical computing device that is communicatively coupled to a quantum computing device.

The steps of the method 100 shown in FIG. 4A may be performed at the classical computing device.

At step 102, the method 100 includes receiving a plurality of classical shadow measurement results associated with a fermion wavefunction. The fermion wavefunction describes a plurality of fermions in a particle-number-conserving fermion system that occupy a plurality of modes.

At step 104, the method 100 further includes computing an estimated k-reduced density matrix (k-RDM), where k is a number of ladder operator pairs. Each of the ladder operator pairs includes a fermion creation operator and a fermion annihilation operator.

Step 104 includes step 106, which is performed for each of the classical shadow measurement results. At step 106, computing the estimated k-RDM further includes computing, as terms of the estimated k-RDM, a plurality of traces of respective products of: a number operator of the particle-number-conserving fermion system, a single-particle basis rotation matrix, a plurality of elementary symmetric polynomials of a plurality of Majorana bivectors respectively associated with the plurality of fermions, and a conjugate transpose of the single-particle basis rotation matrix. The single-particle basis rotation matrix is dependent upon the classical shadow measurement result, although the single-particle basis rotation matrix is not explicitly computed in the example of FIG. 4A. The estimated k-RDM may be computed as a sum of four or fewer of the terms computed in step 106. Computing each of the traces at step 106 includes, at step 108, iteratively computing a plurality of derivatives of a Pfaffian.

At step 110, the method 100 further includes outputting the estimated k-RDM. The estimated k-RDM may be output to an additional computing process at which one or more estimated values of an observable are computed using the estimated k-RDM. For example, the additional computing process may be a quantum chemistry simulation program. The observable may, for example, be an energy, a density, a dipole moment, or some other observable of the fermion system. Observables of the particle-number-conserving fermion system may be expressed as linear combinations of k-RDMs.

FIG. 4B shows additional steps of the method 100 that may be performed for each of the classical shadow measurement results. At step 112, the method 100 may further include generating the classical shadow measurement results. At step 114, step 112 may include sampling a unitary matrix from a Haar random distribution. The unitary matrix may have a dimension equal to the number of modes.

At step 116, step 112 may further include sampling the classical shadow measurement result from a rotated fermion wavefunction. The rotated fermion wavefunction may be computed based at least in part on the fermion wavefunction and on a sampling rotation matrix that encodes a rotation by the unitary matrix. The plurality of classical shadow measurement results may be received from the quantum computing device, at which the rotated fermion wavefunction may be prepared. The rotated fermion wavefunction may be a product of the sampling rotation matrix, the fermion wavefunction, and a conjugate transpose of the sampling rotation matrix. The classical shadow measurement results may be sampled without explicitly computing the sampling rotation matrix, which may be inefficient to compute.

At step 118, for each of the classical shadow measurement results, the method 100 may further include computing a permutation matrix that maps elements of the classical shadow measurement result to the fermions included in the particle-number-conserving fermion system. The method 100 may further include, at step 120, computing a classical shadow as a product of the permutation matrix and the unitary matrix.

At step 122, the method 100 may further include computing a rotated unitary matrix as a product of a phase matrix and the classical shadow. The single-particle basis rotation matrix may encode a rotation by the rotated unitary matrix. The phase matrix may be computed based at least in part on the number of ladder operator pairs, the total number of modes, and a randomly selected phase angle. Accordingly, the single-particle basis rotation matrix used when computing the k-RDM depends upon the classical shadow.

FIG. 4C shows additional steps of the method 100 that may be performed when performing steps 106 and 108. At step 124, the method 100 may further include computing an intermediate matrix based at least in part on the rotated unitary matrix, a total number of the plurality of fermions, a total number of the plurality of modes, and the number of ladder operator pairs. At step 126, the method 100 may further include computing the Pfaffian as a Pfaffian of the intermediate matrix. In addition, at step 128, the method 100 may further include computing the derivatives of the Pfaffian with integer orders from one to the number of fermions. For example, computing the derivatives of the Pfaffian may include iteratively computing traces of powers of an additional matrix generated from the rotated unitary matrix.

In examples in which the steps of FIG. 4C are performed, the estimated k-RDM may be computed with a time complexity of $\mathcal{O}(\eta^2 + k^2 \eta)$, where $\eta$ is a total number of the plurality of fermions. This time complexity represents a significant speedup over the $\mathcal{O}(n^5)$ time complexity of prior approaches to k-RDM estimation.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 5 schematically shows a non-limiting embodiment of a computing system 200 that can enact one or more of the methods and processes described above. Computing system 200 is shown in simplified form. Computing system 200 may embody the computing system 10 described above and illustrated in FIG. 2. Computing system 200 may take the form of one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 5.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory, semiconductor memory, and/or magnetic memory, or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 200 to send and/or receive messages to and/or from other devices via a network such as the Internet.

The following paragraphs provide additional support for the claims of the subject application. According to one aspect, a computing device is provided, comprising one or more processing devices configured to receive a plurality of classical shadow measurement results associated with a fermion wavefunction, wherein the fermion wavefunction describes a plurality of fermions in a particle-number-conserving fermion system that occupy a plurality of modes. The one or more processing devices are further configured to compute an estimated k-reduced density matrix (k-RDM), where k is a number of ladder operator pairs, at least in part by, for each of the classical shadow measurement results, computing, as terms of the estimated k-RDM, a plurality of traces of respective products of: (1) a number operator of the particle-number-conserving fermion system; a single-particle basis rotation matrix dependent upon the classical shadow measurement result; (2) a plurality of elementary symmetric polynomials of a plurality of Majorana bivectors respectively associated with the plurality of fermions; and (3) a conjugate transpose of the single-particle basis rotation matrix, wherein computing each of the traces includes iteratively computing a plurality of derivatives of a Pfaffian. The one or more processors are further configured to output the estimated k-RDM.

In this aspect, the one or more processing devices can be configured to receive the plurality of classical shadow measurement results from a quantum computing device.

In this aspect, the one or more processing devices can be further configured to generate the plurality of classical shadow measurement results at least in part by, for each of the classical shadow measurement results: sampling a unitary matrix from a Haar random distribution; and sampling the classical shadow measurement result from a rotated fermion wavefunction, wherein the rotated fermion wavefunction is computed based at least in part on the fermion wavefunction and on a sampling rotation matrix that encodes a rotation by the unitary matrix.

In this aspect, for each of the plurality of classical shadow measurement results, the one or more processing devices can be further configured to: compute a permutation matrix that maps elements of the classical shadow measurement result to the fermions included in the particle-number-conserving fermion system; and compute a classical shadow as a product of the permutation matrix and the unitary matrix. Further in this aspect, the one or more processing devices can be further configured to compute a rotated unitary matrix as a product of a phase matrix and the classical shadow, wherein the single-particle basis rotation matrix encodes a rotation by the rotated unitary matrix. Further in this aspect, the Pfaffian can be a Pfaffian of an intermediate matrix; and the one or more processing devices can be configured to compute the intermediate matrix based at least in part on the rotated unitary matrix, a total number of the plurality of fermions, a total number of the plurality of modes, and the number of ladder operator pairs. Still further in this aspect, the one or more processing devices can be further configured to compute the phase matrix based at least in part on the number of ladder operator pairs, the total number of modes, and a randomly selected phase angle.

In this aspect, the one or more processing devices can be further configured to compute the plurality of Majorana bivectors as products of pairs of Majorana representations of the fermions.

In this aspect, the plurality of elementary symmetric polynomials of the plurality of Majorana bivectors can include the elementary symmetric polynomials with integer degrees from zero to the number of fermions.

In this aspect, the one or more processing devices can be configured to compute the derivatives of the Pfaffian with integer orders from one to the number of fermions.

In this aspect, the one or more processing devices can be configured to compute the estimated k-RDM with a time complexity of $\mathcal{O}(\eta^2 + k^2 \eta)$, where $\eta$ is a total number of the plurality of fermions.

In this aspect, the one or more processing devices can be further configured to estimate an observable of the fermion wavefunction based at least in part on the estimated k-RDM.

According to another aspect, a method for use with a computing device is provided, the method comprising: receiving a plurality of classical shadow measurement results associated with a fermion wavefunction, wherein the fermion wavefunction describes a plurality of fermions in a particle-number-conserving fermion system that occupy a plurality of modes. The method further comprises computing an estimated k-reduced density matrix (k-RDM), where k is a number of ladder operator pairs, at least in part by, for each of the classical shadow measurement results, computing, as terms of the estimated k-RDM, a plurality of traces of respective products of: (1) a number operator of the particle-number-conserving fermion system; (2) a single-particle basis rotation matrix dependent upon the classical shadow measurement result; (3) a plurality of elementary symmetric polynomials of a plurality of Majorana bivectors respectively associated with the plurality of fermions; and (4) a conjugate transpose of the single-particle basis rotation matrix. Each of the traces includes iteratively computing a plurality of derivatives of a Pfaffian. The method further comprises outputting the estimated k-RDM.

In this aspect, the plurality of classical shadow measurement results can be received from a quantum computing device.

In this aspect, the method can further comprise generating the plurality of classical shadow measurement results at least in part by, for each of the classical shadow measurement results: sampling a unitary matrix from a Haar random distribution; and sampling the classical shadow measurement result from a rotated fermion wavefunction, wherein the rotated fermion wavefunction is computed based at least in part on the fermion wavefunction and on a sampling rotation matrix that encodes a rotation by the unitary matrix.

In this aspect, the method can further comprise, for each of the classical shadow measurement results: computing a permutation matrix that maps elements of the classical shadow measurement result to the fermions included in the particle-number-conserving fermion system; and computing a classical shadow as a product of the permutation matrix and the unitary matrix.

In this aspect, the method can further comprise computing a rotated unitary matrix as a product of a phase matrix and the classical shadow, wherein the single-particle basis rotation matrix encodes a rotation by the rotated unitary matrix. Further in this aspect, the Pfaffian can be a Pfaffian of an intermediate matrix; and the method can further include computing the intermediate matrix based at least in part on the rotated unitary matrix, a total number of the plurality of fermions, a total number of the plurality of modes, and the number of ladder operator pairs.

In this aspect, the estimated k-RDM can be computed with a time complexity of $\mathcal{O}(\eta^2 + k^2 \eta)$, where $\eta$ is a total number of the plurality of fermions.

According to another aspect, a computing system is provided, comprising a quantum computing device and a classical computing device. The quantum computing device is configured to: prepare a fermion wavefunction, wherein the fermion wavefunction describes a plurality of fermions in a particle-number-conserving fermion system that occupy a plurality of modes; and measure a plurality of classical shadow measurement results associated with the fermion wavefunction. The classical computing device includes one or more processing devices configured to: receive the plurality of classical shadow measurement results; and compute an estimated k-reduced density matrix (k-RDM), where k is a number of ladder operator pairs. The estimated k-RDM can be computed at least in part by, for each of the classical shadow measurement results, computing, as terms of the estimated k-RDM, a plurality of traces of respective products of: (1) a number operator of the particle-number-conserving fermion system; (2) a single-particle basis rotation matrix dependent upon the classical shadow measurement result; (3) a plurality of elementary symmetric polynomials of a plurality of Majorana bivectors respectively associated with the plurality of fermions; and a conjugate transpose of the single-particle basis rotation matrix, wherein computing each of the traces includes iteratively computing a plurality of derivatives of a Pfaffian. The one or more processing devices are further configured to output the estimated k-RDM.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
one or more processing devices configured to:
  receive a plurality of classical shadow measurement results associated with a fermion wavefunction, wherein the fermion wavefunction describes a plurality of fermions in a particle-number-conserving fermion system that occupy a plurality of modes;
  compute an estimated k-reduced density matrix (k-RDM), where k is a number of ladder operator pairs, at least in part by, for each of the classical shadow measurement results:
    computing, as terms of the estimated k-RDM, a plurality of traces of respective products of:
      a number operator of the particle-number-conserving fermion system;
      a single-particle basis rotation matrix dependent upon the classical shadow measurement result;
      a plurality of elementary symmetric polynomials of a plurality of Majorana bivectors respectively associated with the plurality of fermions; and
      a conjugate transpose of the single-particle basis rotation matrix, wherein computing each of the traces includes iteratively computing a plurality of derivatives of a Pfaffian; and
    output the estimated k-RDM.

2. The computing device of claim 1, wherein the one or more processing devices are configured to receive the plurality of classical shadow measurement results from a quantum computing device.

3. The computing device of claim 2, wherein the one or more processing devices are further configured to generate the plurality of classical shadow measurement results at least in part by, for each of the classical shadow measurement results:
  sampling a unitary matrix from a Haar random distribution; and
  sampling the classical shadow measurement result from a rotated fermion wavefunction, wherein the rotated fermion wavefunction is computed based at least in part on the fermion wavefunction and on a sampling rotation matrix that encodes a rotation by the unitary matrix.

4. The computing device of claim 3, wherein, for each of the plurality of classical shadow measurement results, the one or more processing devices are further configured to:
  compute a permutation matrix that maps elements of the classical shadow measurement result to the fermions included in the particle-number-conserving fermion system; and
  compute a classical shadow as a product of the permutation matrix and the unitary matrix.

5. The computing device of claim 4, wherein the one or more processing devices are further configured to compute a rotated unitary matrix as a product of a phase matrix and the classical shadow, wherein the single-particle basis rotation matrix encodes a rotation by the rotated unitary matrix.

6. The computing device of claim 5, wherein:
  the Pfaffian is a Pfaffian of an intermediate matrix; and
  the one or more processing devices are configured to compute the intermediate matrix based at least in part on the rotated unitary matrix, a total number of the plurality of fermions, a total number of the plurality of modes, and the number of ladder operator pairs.

7. The computing device of claim 6, wherein the one or more processing devices are further configured to compute the phase matrix based at least in part on the number of ladder operator pairs, the total number of modes, and a randomly selected phase angle.

8. The computing device of claim 1, wherein the one or more processing devices are further configured to compute the plurality of Majorana bivectors as products of pairs of Majorana representations of the fermions.

9. The computing device of claim 1, wherein the plurality of elementary symmetric polynomials of the plurality of Majorana bivectors includes the elementary symmetric polynomials with integer degrees from zero to the number of fermions.

10. The computing device of claim 1, wherein the one or more processing devices are configured to compute the derivatives of the Pfaffian with integer orders from one to the number of fermions.

11. The computing device of claim 1, wherein the one or more processing devices are configured to compute the estimated k-RDM with a time complexity of $\mathcal{O}(\eta^2 + k^2 \eta)$, where $\eta$ is a total number of the plurality of fermions.

12. The computing device of claim 1, wherein the one or more processing devices are further configured to estimate an observable of the fermion wavefunction based at least in part on the estimated k-RDM.

13. A method for use with a computing device, the method comprising:

receiving a plurality of classical shadow measurement results associated with a fermion wavefunction, wherein the fermion wavefunction describes a plurality of fermions in a particle-number-conserving fermion system that occupy a plurality of modes;

computing an estimated k-reduced density matrix (k-RDM), where k is a number of ladder operator pairs, at least in part by, for each of the classical shadow measurement results:

computing, as terms of the estimated k-RDM, a plurality of traces of respective products of:
a number operator of the particle-number-conserving fermion system;
a single-particle basis rotation matrix dependent upon the classical shadow measurement result;
a plurality of elementary symmetric polynomials of a plurality of Majorana bivectors respectively associated with the plurality of fermions; and
a conjugate transpose of the single-particle basis rotation matrix,
wherein computing each of the traces includes iteratively computing a plurality of derivatives of a Pfaffian; and
outputting the estimated k-RDM.

14. The method of claim 13, wherein the plurality of classical shadow measurement results are received from a quantum computing device.

15. The method of claim 13, further comprising generating the plurality of classical shadow measurement results at least in part by, for each of the classical shadow measurement results:

sampling a unitary matrix from a Haar random distribution; and sampling the classical shadow measurement result from a rotated fermion wavefunction, wherein the rotated fermion wavefunction is computed based at least in part on the fermion wavefunction and on a sampling rotation matrix that encodes a rotation by the unitary matrix.

16. The method of claim 15, further comprising, for each of the classical shadow measurement results:

computing a permutation matrix that maps elements of the classical shadow measurement result to the fermions included in the particle-number-conserving fermion system; and computing a classical shadow as a product of the permutation matrix and the unitary matrix.

17. The method of claim 16, further comprising computing a rotated unitary matrix as a product of a phase matrix and the classical shadow, wherein the single-particle basis rotation matrix encodes a rotation by the rotated unitary matrix.

18. The method of claim 17, wherein:

the Pfaffian is a Pfaffian of an intermediate matrix; and the method further includes computing the intermediate matrix based at least in part on the rotated unitary matrix, a total number of the plurality of fermions, a total number of the plurality of modes, and the number of ladder operator pairs.

19. The method of claim 13, wherein the estimated k-RDM is computed with a time complexity of $\mathcal{O}\,(\eta^2+k^2\eta)$, where $\eta$ is a total number of the plurality of fermions.

20. A computing system comprising:

a quantum computing device configured to:

prepare a fermion wavefunction, wherein the fermion wavefunction describes a plurality of fermions in a particle-number-conserving fermion system that occupy a plurality of modes; and measure a plurality of classical shadow measurement results associated with the fermion wavefunction; and a classical computing device including one or more processing devices configured to:

receive the plurality of classical shadow measurement results;

compute an estimated k-reduced density matrix (k-RDM), where k is a number of ladder operator pairs, at least in part by, for each of the classical shadow measurement results:

computing, as terms of the estimated k-RDM, a plurality of traces of respective products of:
a number operator of the particle-number-conserving fermion system;
a single-particle basis rotation matrix dependent upon the classical shadow measurement result;
a plurality of elementary symmetric polynomials of a plurality of Majorana bivectors respectively associated with the plurality of fermions; and
a conjugate transpose of the single-particle basis rotation matrix,
wherein computing each of the traces includes iteratively computing a plurality of derivatives of a Pfaffian; and
output the estimated k-RDM.

* * * * *